United States Patent
Sivasankaran et al.

(10) Patent No.: US 7,965,623 B1
(45) Date of Patent: *Jun. 21, 2011

(54) LAN SWITCH WITH RAPID FAULT RECOVERY

(75) Inventors: Dileep Sivasankaran, Fremont, CA (US); Frank S. Madren, Los Gatos, CA (US); Peter R. Wood, Los Altos, CA (US)

(73) Assignee: Garrettcom, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/542,836

(22) Filed: Aug. 18, 2009

Related U.S. Application Data

(63) Continuation of application No. 10/678,977, filed on Oct. 3, 2003, now Pat. No. 7,593,319.

(60) Provisional application No. 60/418,896, filed on Oct. 15, 2005, provisional application No. 60/467,273, filed on May 2, 2003.

(51) Int. Cl.
  *G06F 11/00* (2006.01)
  *G08C 15/00* (2006.01)

(52) U.S. Cl. ........ 370/216; 370/217; 370/218; 370/219; 370/225; 370/228

(58) Field of Classification Search .................. 370/216, 370/217, 396–398, 400–401
  See application file for complete search history.

(56) References Cited

U.S. PATENT DOCUMENTS

| | | | |
|---|---|---|---|
| 5,132,962 A | 7/1992 | Hobgood et al. | |
| 5,968,130 A | 10/1999 | Okanoue et al. | |
| 6,026,073 A | 2/2000 | Brown et al. | |
| 6,147,965 A | 11/2000 | Burns et al. | |
| 6,330,229 B1 | 12/2001 | Jain et al. | |
| 6,556,541 B1 | 4/2003 | Bare | |
| 6,594,776 B1 | 7/2003 | Karighattam et al. | |
| 7,246,168 B1 | 7/2007 | Bales | |
| 7,428,209 B1 | 9/2008 | Roberts | |
| 7,593,319 B1 | 9/2009 | Sivasankaran et al. | |
| 2001/0021177 A1 | 9/2001 | Ishii | |
| 2002/0129226 A1 | 9/2002 | Eisen et al. | |
| 2003/0002462 A1 | 1/2003 | Tanoue | |
| 2003/0016624 A1 | 1/2003 | Bare | |
| 2003/0112826 A1 | 6/2003 | Ashwood Smith et al. | |
| 2003/0117944 A1 | 6/2003 | Donoghue et al. | |
| 2003/0161275 A1 | 8/2003 | Malhotra et al. | |
| 2003/0163555 A1 | 8/2003 | Battou et al. | |
| 2007/0206492 A1* | 9/2007 | Zelig et al. | 370/218 |
| 2008/0205302 A1 | 8/2008 | Florit et al. | |
| 2008/0225695 A1 | 9/2008 | Balus et al. | |
| 2009/0219808 A1* | 9/2009 | Ogura | 370/223 |
| 2009/0323518 A1* | 12/2009 | Rose et al. | 370/223 |

OTHER PUBLICATIONS

Cisco—Understanding Spanning-Tree Protocol, 12 sheets [retrieved on Nov. 23, 2009]. Retrieved from the internet: http://www.cisco.com/univercd/cc/td/doc/product/rtrmgmt/sw_ntman/cwsimain/cwsi2/cwsiug2/vlan2/stpapp.htm.

(Continued)

*Primary Examiner* — Chi H Pham
*Assistant Examiner* — Farah Faroul
(74) *Attorney, Agent, or Firm* — Okamoto & Benedicto LLP

(57) ABSTRACT

One embodiment disclosed relates to a method of fault recovery by a switch in a local area network. A link failure is detected at a port of the switch. In response to the link failure detection, a MAC address table of the switch is cleared. Clearing the address table causes a discovery process to fill the table to begin immediately. In addition, a link on another port of the switch may be dropped to propagate the link failure.

16 Claims, 4 Drawing Sheets

OTHER PUBLICATIONS

Cisco—Understanding Rapid Spanning Tree Protocol (802.1w), 19 sheets [retrieved on Nov. 23, 2009] Retrieved from the internet: http://chand.lums.edu.pk/cs573/resources/RSTP_802.1w.pdf.

Cisco—Understanding Spanning-Tree Protocol Topology Changes, 8 sheets [retrieved on Nov. 23, 2009] Retrieved from the internet: http://www.cisco.com/application/pdf/paws/12013/17.pdf.

* cited by examiner

LAN SWITCH WITH RAPID FAULT RECOVERY

RELATED APPLICATIONS

The present application is a continuation of U.S. patent application Ser. No. 10/678,977, filed Oct. 3, 2003, entitled "LAN Switch with Rapid Fault Recovery," with inventors Dileep Sivasankaran, et al., issued on Sep. 22, 2009 as U.S. Pat. No. 7,593,319, the disclosure of which is hereby incorporated by reference in its entirety.

U.S. patent application Ser. No. 10/678,977 claims the benefit of U.S. provisional patent application No. 60/418,896, filed Oct. 15, 2002, entitled "System and method for operation of managed ethernet LAN switch products in redundant network configurations with fast recovery from faults," the disclosure of which is hereby incorporated by reference in its entirety. U.S. patent application Ser. No. 10/678,977 also claims the benefit of U.S. provisional patent application No. 60/467,273, filed May 2, 2003, entitled "System and method for S-Ring, a fast recovery enhancement to spanning tree protocol," the disclosure of which is hereby incorporated by reference in its entirety.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates generally to computer networking.

2. Description of the Background Art

Spanning tree protocol (STP) is a link management protocol that prevents undesirable loops in a network while providing path redundancy. Undesirable loops occur when there are multiple active paths between stations. If a loop exists, a switch or bridge may see stations appearing on both sides of the switch. This can confuse the forwarding algorithm, allowing duplicate frames to be forwarded.

STP defines a tree that spans all switches in an extended network and forces select redundant data paths into a standby or blocked state. If one segment of the network becomes unreachable, STP can re-establishes a link to that segment by activating a standby path.

SUMMARY

One embodiment of the invention pertains to a method of fault recovery by a switch in a local area network. A link failure is detected at a port of the switch. In response to the link failure detection, a MAC address table of the switch is cleared. Clearing the address table causes a discovery process to fill the table to begin immediately. In addition, a link on another port of the switch may be dropped to propagate the link failure.

Another embodiment of the invention relates to a network apparatus that includes a MAC address table and a plurality of ports. At least one port of the apparatus is configured to implement a link-loss-learn protocol.

Another embodiment of the invention relates to a network that includes a plurality of Ethernet switches in a redundant topology. At least one switch is configured to implement a link-loss-learn protocol for rapid fault recovery.

DETAILED DESCRIPTION

Figure 1A:
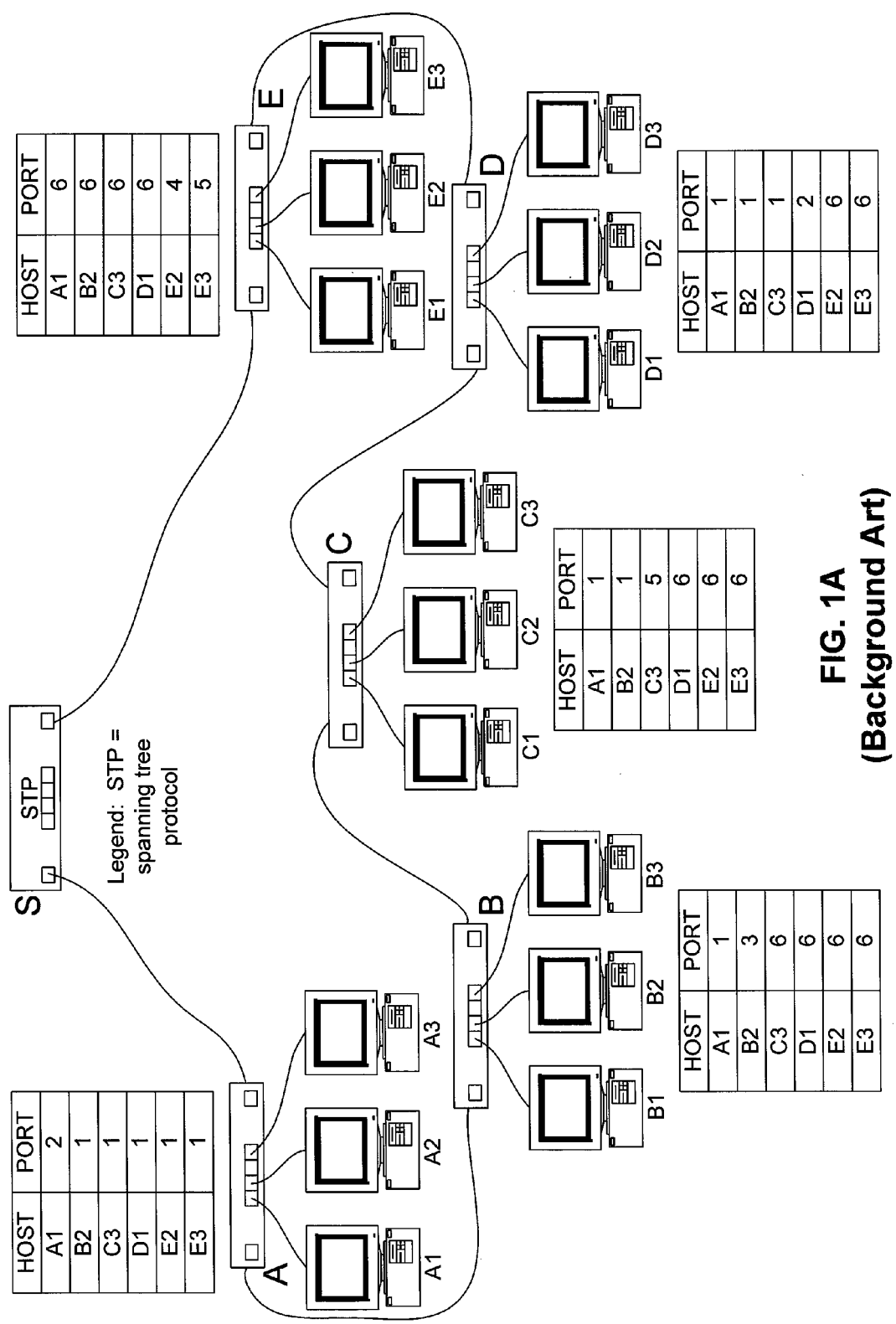
FIG. 1A is a diagram of depicting a simple network topology for discussion purposes.

FIG. 1A is a diagram of depicting a simple network topology for discussion purposes. Depicted are a number of networking switches S, A, B, C, D, and E. In this example, the switches are interconnected together in a ring topology. Switch S may be particularly configured to implement STP.

Various hosts are shown connected to switch ports. Hosts A1, A2, and A3 are shown as connected to ports of switch A, hosts B1, B2, and B3 are shown as connected to ports of switch B, and so on. In addition, example Media Access Control (MAC) address tables in some of the switches are illustrated. For example, the address table in switch A has host address A1 associated with port 2, and host addresses B2, C3, D1, E2, and E3 each associated with port 1.

Such a ring should have a port somewhere in the series the operates in a "blocked" mode. Such a blocked port does not pass packets so that a correct Ethernet topology without looping exists. The control of which port is blocked is determined by logic to manage operating the network and to facilitate recovery from faults. In this example, the ring topology network is initially configured such that the link between switch S and switch E is blocked or in a standby state. This prevents an undesirable loop from being present.

When a link fails on a switch port in such a redundant LAN, another back-up port is expected to eventually take over and keep the network packets flowing. The back-up port is connected and ready to provide service. However, a conventional Ethernet switch engine will continue to use the old MAC address table and will continue to try and forward packets to the failed port. This will go on until the address table aging time expires for the addresses whose connections was lost. The aging time is typically 4 or 5 minutes. As described in the following, Spanning Tree Protocol improves on that situation.

Figure 2:
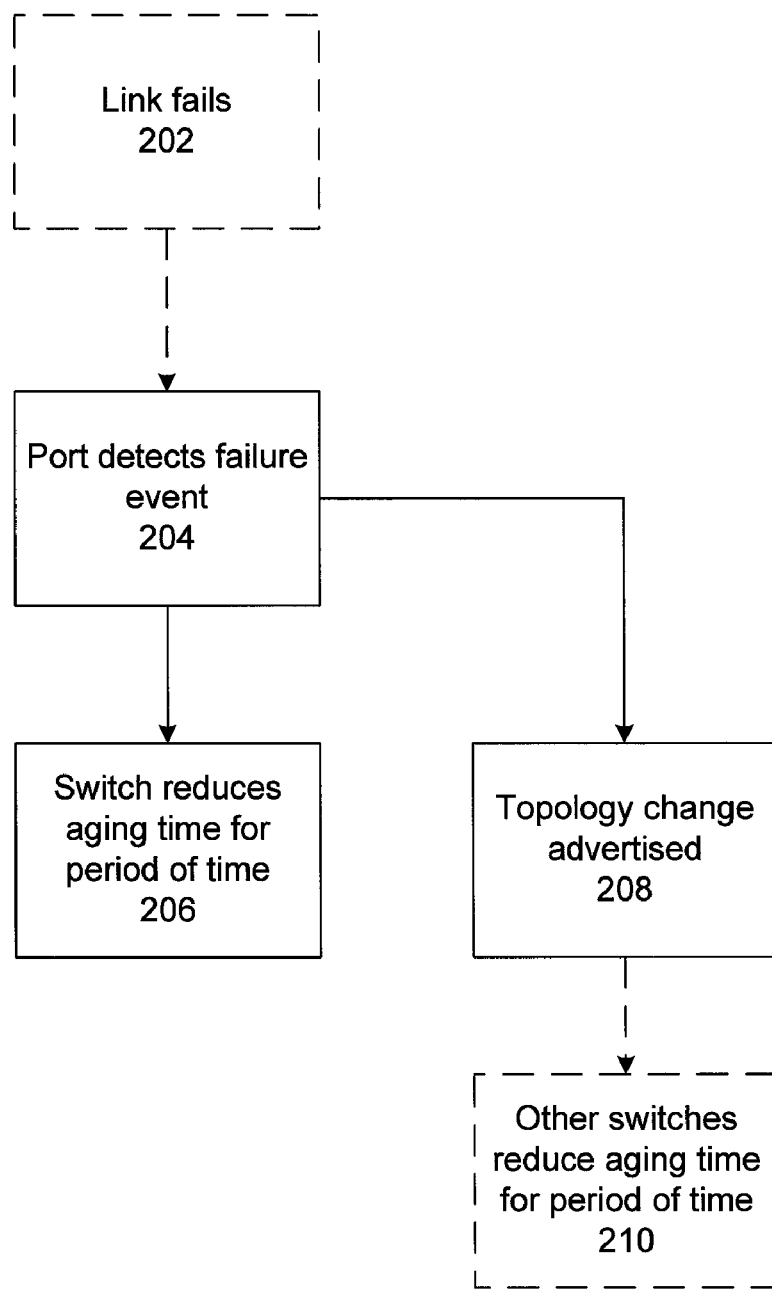
FIG. 2 is a flow chart depicting a method of fault recovery in a local area network in accordance with IEEE 802.1d Spanning Tree Protocol.

FIG. 2 is a flow chart depicting a method of fault recovery in a local area network in accordance with IEEE 802.1d Spanning Tree Protocol. The steps performed by the switch detecting the failure event are shown by solid lines, and the steps occurring outside the switch are shown by dashed lines.

Figure 1B:
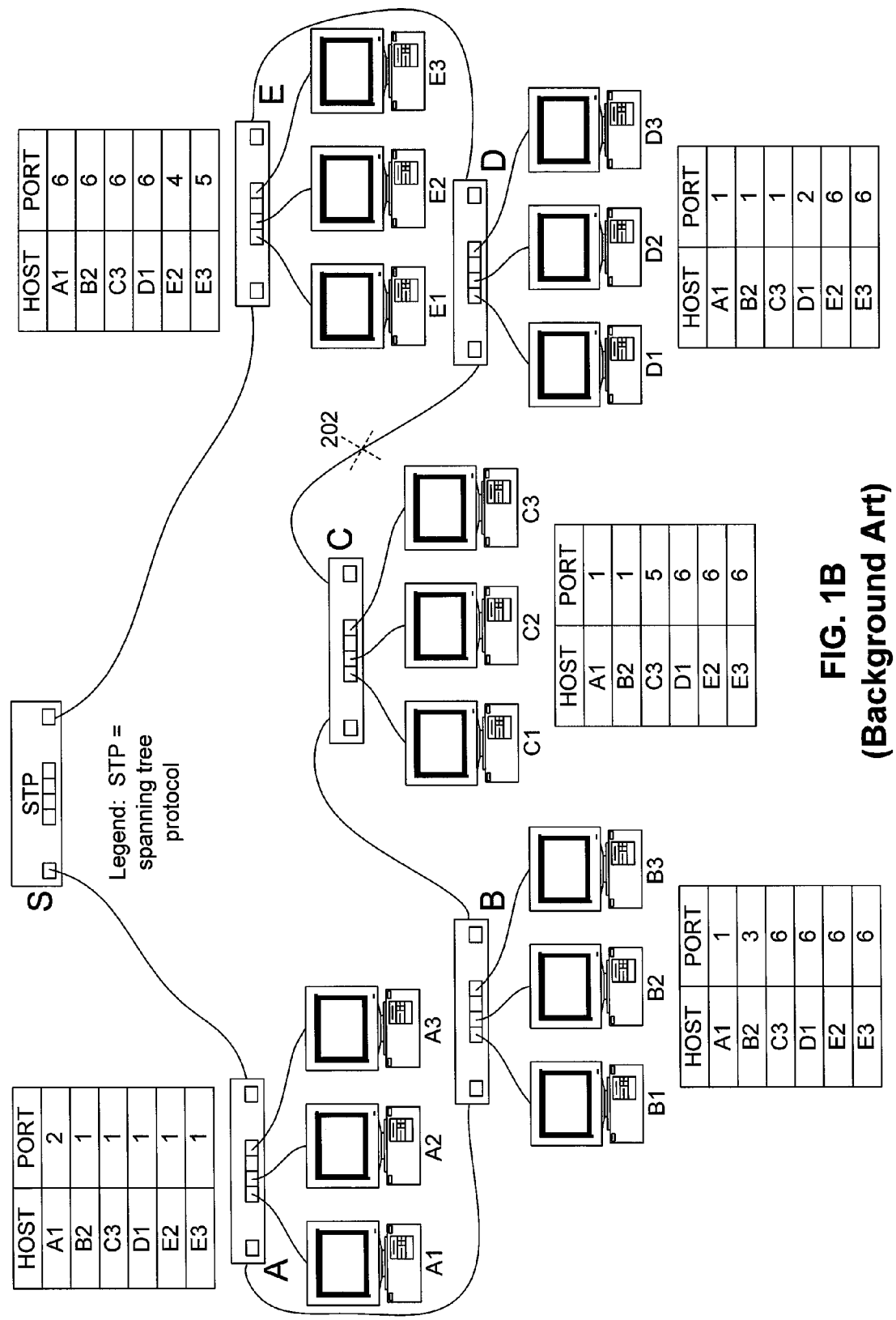
FIG. 1B depicts a link failure in the simple network topology.

The process begins when a link to a switch port fails 202. As a particular example, consider the link between switches C and D fails 202, possibly due to a cable cut, as depicted in FIG. 1B. This interrupts communication between a first network segment including switches S, A, B, and C and a second network segment including switches D and E. Other causes of link failure include a unit losing power, a unit failing while in operation, and other reasons.

Next, a switch port connecting to the failed link detects 204 the failure. This detection 204 may occur, for example, due to failure to receive a link signal that is normally periodically transmitted over the link to the port.

The switch configured in accordance with the Spanning Tree Protocol performs two actions upon detecting 204 the link failure. In one action, the switch reduces 206 the aging time associated with entries in its MAC address table. Specifically, the aging time is reduced from the normal aging time (default of three hundred seconds, or five minutes) to the forward_delay time (default of fifteen seconds). The reduction in aging time is kept in effect for a certain period of time (max age plus forward_delay) and then the aging time returns to its normal value.

In the other action, the switch advertises 208 the topology change. This is done by the switch sending out a topology change notification (TCN) on its root port. The TCN is in the form of a simple bridge protocol data unit (BPDU). The designated switch receives the TCN, acknowledges it, and generates another TCN for sending out of its own root port. This continues on until the root switch receives the TCN. Thereafter, the root switch starts sending out its configuration BPDUs with the topology change (TC) bit set. These BPDUs are relayed by the switches until each switch in the tree is aware of the topology change situation and reduces 210 its aging time to the forward_delay time.

Hence, according to the STP method, the switches eventually reduce their aging time to the forward_delay time. After the forward_delay time, entries in the table that are no longer valid due to the failed link will expire. For example, after the link between C and D goes down in FIG. 1B, switch C will not receive any packet from host D1 on its port 6 and so will age out the entry for host D1 on this port. Similarly for the entries for hosts E2 and E3. Then, when the link between S and E goes to forwarding (instead of being blocked), the relevant traffic is flooded and transmitted via this unblocked path to the destination hosts.

The STP method is considered to be clever because traffic related to entries not affected by the broken link continues to be transmitted and those unaffected entries in the MAC address tables do not have to be relearned. Unfortunately, because the entries do not expire until after the forward_delay time, the network takes at least that long, typically at least 15 seconds by default, to recover from the broken link. For many industrial networks, this time of less than a minute for fault recover is an acceptable delay. However, in other networks, the delay may be unacceptable.

Figure 3:
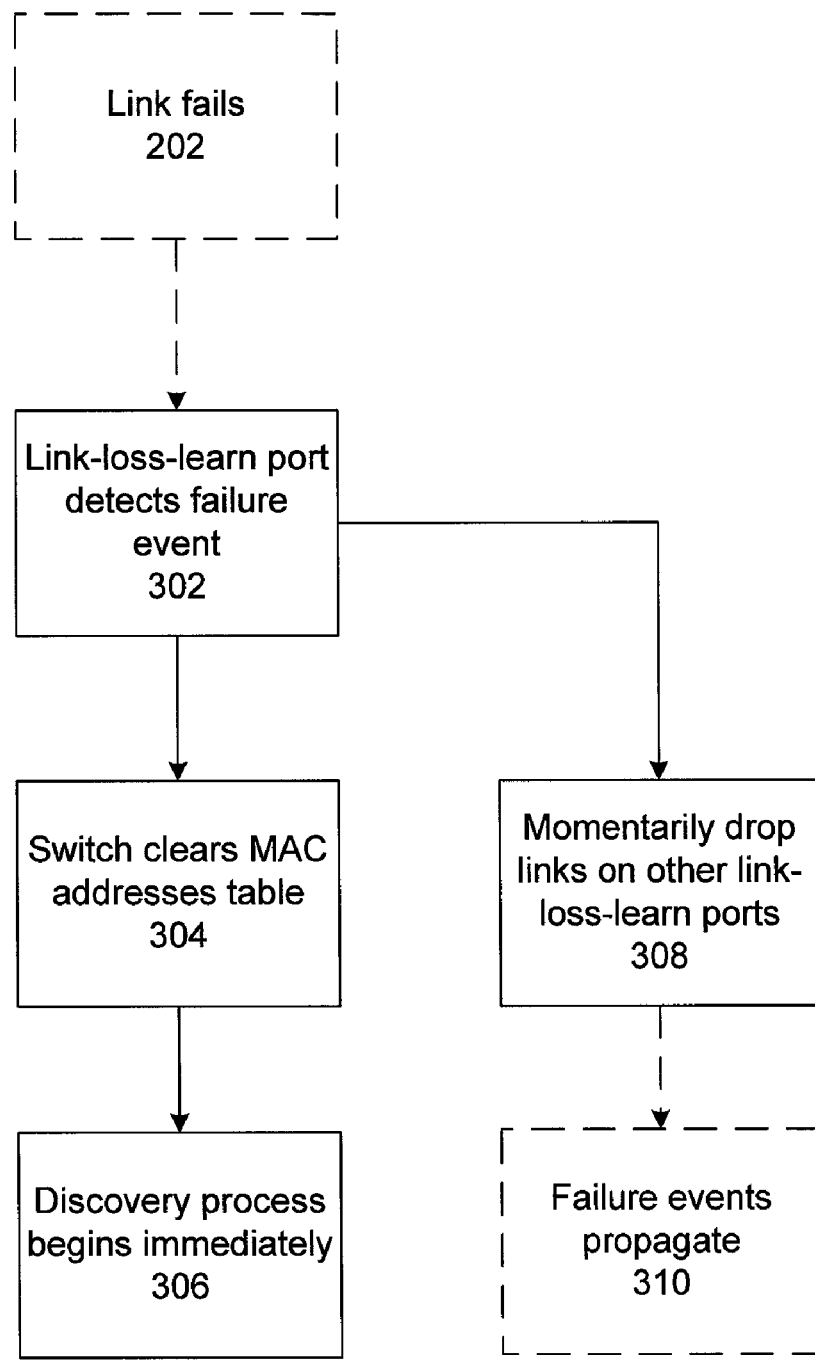
FIG. 3 is a flow chart depicting a method of fault recovery in a local area network in accordance with one embodiment of the invention.

FIG. 3 is a flow chart depicting a method of fault recovery in a local area network in accordance with one embodiment of the invention. Again, the steps performed by the switch detecting the failure event are shown by solid lines, and the steps occurring outside the switch are shown by dashed lines.

In accordance with an embodiment of the invention, the switch has various ports, some of which may be configured or enabled by a user or network administrator to behave in a "link-loss-learn" manner as described below. Other ports may be configured to not implement link-loss-learn. A user can elect to enable the link-loss-learn feature on one port, two ports, all ports, or none of the ports. A typical configuration may be to enable link-loss-learn on two ports connected to an optical fiber network because such ports are often used to connect the switch into the redundant network topology. Without a redundant network topology, the link-loss-learn feature does not generally provide a benefit and hence may be turned off (though may be kept on).

Like FIG. 2, the process begins when a link to a switch port fails 202. Again, consider a particular example where the link between switches C and D fails 202, possibly due to a cable cut, as depicted in FIG. 1B. This interrupts communication between a first network segment including switches S, A, B, and C and a second network segment including switches D and E. Other causes of link failure include a unit losing power, a unit failing while in operation, and other reasons.

Similar to FIG. 2, a switch port connecting to the failed link detects 302 the failure. This detection 302 may occur, for example, due to failure to receive a link signal that is normally periodically transmitted over the link to the port. However, in this case, the port detecting the link failure is link-loss-learn configured and so the switch responds as described below.

In contrast to FIG. 2, the response by the switch to the failure event is not to reduce 206 the aging time and send out 208 a topology change notification. Instead, in accordance with an embodiment of the invention, the switch responds with two different actions. One action involves clearing 304 the switch's table of MAC addresses. Conventionally, this action is considered disadvantageous in that, while entries made invalid by the failure event are cleared, entries that are still valid and unaffected by the failure event are also cleared. Hence, clearing 304 the entire table is considered under conventional wisdom to be inefficient. On the contrary, applicants have discovered that clearing the MAC address table advantageously facilitates a more rapid fault recovery. This is because clearing the table results in the discovery process to fill the table beginning immediately 306. Hence, as soon as a packet is received by the switch, the packet is flooded to the network, and its address is learned. The discovery process continues rapidly until all addresses are learned and operation is normal, but with new information now in the address table on how to switch the packets. Some bandwidth is used unnecessarily (compared with the conventional method) during the re-learning, but the recovery process is not delayed by the wait associated with the forward_delay time that is typically fifteen seconds.

In one embodiment, the MAC address table may be flushed by overwriting each entry in the table with a template that is temporarily stored in a register. The template would be that of a cleared entry. In an alternate embodiment, the MAC address table may be flushed by momentarily turning off power within the switch. The alternate embodiment may be disadvantageous in that delay is added due to additional activity (restoring state variables, testing, and so on) on power up.

The other action involves the switch temporarily or momentarily dropping 308 links on other link-loss-learn enabled ports. This action is performed so as to propagate 310 the failure event to other switches with link-loss-learn capability. In one embodiment, the duration for the dropping 308 of the link is sufficiently long for the link drop to be detected (typically, more than five milliseconds), but short enough to as to not substantially impact communications. For example, the duration of the link drop may be 5, 10, 20, or 50 milliseconds. Preferably, the duration is closer to 5 milliseconds. A link-loss-learn port on a neighboring switch may then detect 302 the link failure event, and that switch may then proceed to flush 304 its address table and momentarily drop 308 links on its other link-loss-learn ports. The propagation continues in that a link-loss-learn port on a next neighboring switch may then detect 302 the link failure event, and that switch may then proceed to flush 304 its address table and momentarily drop 308 links on its other link-loss-learn ports. And so on, until the borders of the network topology are reached.

Applicants have implemented an embodiment of the invention in the form of the Magnum mP62 Ethernet Switch available from Garrettcom, Inc. with place of business at 213 Hammond Avenue, Fremont, Calif. 94539. Applicants have discovered that the link-loss-learn feature of the mP62 Switch is very fast (on the order of milliseconds), so that the mP62 Switch is generally not the gating element (i.e. not the slowest element) for fault recovery in a redundant LAN. Whether the redundant paths upstream are controlled by IEEE 802.1d Standard Spanning Tree Protocol, or by IEEE 802.1s Tagged VLAN Spanning Tree Protocol, or by IEEE 802.1w Rapid Spanning Tree Protocol, or manually such as in a bench-test situation, the mP62 with link-loss-learn appears to reset its address table and participate in the LAN configuration change and network recovery faster than the other Ethernet elements. The mP62 product may be configured using set-up commands to run either Spanning Tree Protocol or link-loss-learn.

The following is example software code that may be utilized by a switch in accordance with an embodiment of the invention. The code includes high-level instructions that check link status, clear the MAC address table, and momentarily drop links in accordance with an embodiment of the invention.

```
Macros
#define NO_OF_PORTS // number of ports in switch
#define MS_PER_TICK // conversion factor for time ticks to milliseconds
#define L3_DELAY // delay time value for avoiding loop
#define LINK_DELAY // delay time to keep link dropped
Global Variables
U_INT8 linkStat[NO_OF_PORTS]; //Holds the link status. 0 or down, non zero for up
U_INT32 l3Timer; //Timer to avoid loops
External Functions
extern U_INT8 link_Check(U_INT8 port); //Check link status. return 0 on link down
extern U_INT8 clearAddrTable( )// Clears Address Table
extern U_INT8 drop_Link(U_INT8 port); // Drops link on port
extent U_INT8 make_LinK(U_INT8 port); // turns ON link on port
extern U_INT32 get_Time( ); // gets system time in time ticks
extern U_INT8 delay(U_INT16 time);// delays execution
extern U_INT8 update_LinkStat( ); // updates linkStat array with current link status,
Main function
U_INT8 link_Loss_Check( )
{
  U_INT32 currertTime;
  U_INT8 counter;
  currentTime=get_Time( ) * MS_PER_TICK
  if(currentTime <l3Timer+L3_DELAY) return;
  for(counter=0; counter <NO_OF_PORTS; counter++)
  {
  if(!link_Check(counter) && linkStat[counter])
  {
    for(counter=0; counter <NO_OF_PORTS; counter++)
    {
      drop_Link(counter);
    }
    clearAddrTable( );
    delay(LINK_DELAY);
    for(counter=0; counter <NO_OF_PORTS; counter++)
      make_Link(counter);)
  }
  l3timer=currentTime;
  update_LinkStat( );
  return;
  }
 }
}
```

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of fault recovery by a switch in a local area network, the method comprising:
   a switch port detecting a link failure at a port of the switch;
   in response to the link failure detection, the switch clearing all medium access control (MAC) address entries from a MAC address table of the switch; and
   in further response to the link failure detection, the switch momentarily dropping a link on another port of the switch.

2. The method of claim 1, wherein clearing all MAC address entries from the MAC address table causes a discovery process to fill the MAC address table.

3. The method of claim 1, wherein momentarily dropping a link comprises stopping transmission of a link signal for a period of time.

4. The method of claim 3, wherein momentarily dropping the link on the other port causes propagation of the link failure to a next switch.

5. The method of claim 3, wherein the link is momentarily dropped for a length of time sufficient for a next switch to detect the link drop.

6. The method of claim 5, wherein the length of time is no more than fifty milliseconds.

7. The method of claim 5, wherein the length of time is under ten milliseconds.

8. The method of claim 1, wherein the MAC address table is cleared of all MAC address entries by overwriting each entry in the table with a template from a register.

9. The method of claim 1, wherein the MAC address table is cleared of all MAC address entries by momentarily turning off power within the switch.

10. A network apparatus comprising:
    a medium access control (MAC) address table stored in the apparatus; and
    a plurality of ports of the network apparatus configured to communicatively connect the apparatus to other network devices,
    wherein a protocol is implemented for a plurality of ports of the apparatus, and the protocol is configured with instruction code which, upon detecting a link failure at one of the plurality of ports, clears the MAC address table of all MAC address entries therein and momentarily drops links on all other ports implementing the protocol.

11. The network apparatus of claim 10, wherein the protocol is further configured with instruction code which, upon clearing all MAC address entries from the MAC address table, begins a discovery process.

12. The network apparatus of claim 11, wherein a link is momentarily dropped by stopping transmission of a link signal for a period of time.

13. The network apparatus of claim 12, wherein the network apparatus comprises a multi-port Ethernet switch.

14. A network comprising:
a plurality of Ethernet switches in a redundant topology, wherein at least one switch implements a protocol for rapid fault recovery, wherein the protocol comprises, upon detecting a link failure at a port of the switch, clearing a medium access control (MAC) address table of all MAC address entries therein and momentarily dropping links on all other ports of the switch which implement said protocol.

15. The network of claim 14, wherein upon clearing all MAC address entries from the MAC address table, a discovery process is begun by the switch.

16. The network of claim 15, wherein momentarily dropping a link comprises stopping transmission of a link signal for a period of time.

* * * * *